United States Patent
Baker

[11] Patent Number: 5,941,011
[45] Date of Patent: Aug. 24, 1999

[54] ROD-SHAPED HINGES AND ARTICLES INCORPORATING SAME

[76] Inventor: Monty R. Baker, 415 N. 9th St., Estherville, Iowa 51334

[21] Appl. No.: 08/949,475

[22] Filed: Oct. 14, 1997

[51] Int. Cl.[6] .......................... A01K 77/00; F16C 11/04; E05D 3/06
[52] U.S. Cl. .................................. 43/12; 403/157; 16/366
[58] Field of Search ................................ 43/12; 403/157, 403/161, 150; 16/366, 367

[56] References Cited

U.S. PATENT DOCUMENTS

| | | |
|---|---|---|
| 737,428 | 8/1903 | Lindsey . |
| 1,036,222 | 8/1912 | Griffenberg . |
| 1,524,957 | 2/1925 | Sundberg . |
| 2,991,101 | 7/1961 | Vanwersch et al. . |
| 2,991,102 | 7/1961 | Vanwersch et al. . |
| 2,991,103 | 7/1961 | Vanwersch et al. . |
| 3,655,297 | 4/1972 | Bolen, Jr. et al. . |
| 3,801,208 | 4/1974 | Bourgraf et al. . |
| 4,611,945 | 9/1986 | Diego . |
| 4,653,951 | 3/1987 | Bodle et al. . |
| 5,217,315 | 6/1993 | Rosane . |
| 5,251,359 | 10/1993 | Finkl . |
| 5,364,201 | 11/1994 | LaBarre . |
| 5,380,113 | 1/1995 | Boehm ...................................... 403/102 |
| 5,474,404 | 12/1995 | Chien . |
| 5,588,771 | 12/1996 | Scott et al. . |
| 5,715,573 | 2/1998 | Holemans ................................. 16/287 |

*Primary Examiner*—Jack W. Lavinder
*Attorney, Agent, or Firm*—Richard C. Litman

[57] ABSTRACT

Solid rod-shaped hinges and articles incorporating the same, such as collapsible sports articles, e.g., landing nets and snow sticks. A tubular landing net frame and handle incorporates at least three rod-shaped hinges. The hinge for the landing net comprises a cylindrical base element with locking shoulders on each end with pin rotatable, cylindrical and hooked extension elements. The extension elements have slots to accommodate the pins on the base element. Each extension element has a spring-loaded locking button for interacting with first locking apertures in the tubular net frame and handle. Each hook on the extension element is connected to a spring, anchored within the tubular frame. The folding procedure only requires a pull on the landing net frame at the joints to dislodge the locking buttons to expand the anchor springs and engage the locking buttons in second (limited in diameter) apertures of the tubular frame, thus to hold the net and handle in the folded position. The unfolding procedure requires minimum effort in dislodging the buttons to permit the expanded anchored springs to urge the opening of the landing net and handle. The snow stick incorporates at least two solid rod-shaped hinges. The folded snow stick can be conveniently carried in a case strapped to one's waist and thigh.

18 Claims, 6 Drawing Sheets

ROD-SHAPED HINGES AND ARTICLES INCORPORATING SAME

BACKGROUND OF THE INVENTION

1. Field of the Invention

The present invention relates to hinges and, more specifically, rod-shaped hinges and collapsible articles (e.g., a landing net and a snow stick) incorporating rod-shaped hinges. The landing net article can be used for various purposes such as for fishing, animal catching and the like. The snow stick article can be folded and conveniently carried on one's thigh in a case strapped to the waist and thigh.

2. Description of the Related Art

The related art describes various folding articles and hinges. The art of interest will be discussed in the order of perceived relevance to the present invention.

U.S. Pat. No. 5,217,315 issued on Jun. 8, 1993, to Randy R. Rosane describes a foldable stretcher frame with lockable articulating joints. A connecting link is pinned between two pivoting member heads, which are in turn connected into rotatable bushings, which are inserted in the tubular members of the stretcher frame. Each pivoting member head has a slot between rounded flanges, pinned to the connecting link. By rotating the connecting link and pivoting member heads, the frame can be locked longitudinally or folded upwardly or downwardly. The locking position is effected only in two positions. By virtue of the articulating joints with rounded pivoting member heads, the teaching of this reference is distinguished. The locking feature is not effected in the manner of the present invention.

U.S. Pat. No. 4,611,945 issued on Sep. 16, 1986, to Dennis F. Diego describes a three-part articulating joint or linking element for folding tubular sections with slotted end regions to accept the linking element when folded. The linking element consists of a short solid cylindrical median portion with slotted winged portions on each end, which slide on pivot pins between anchored (welded or screwed) solid cylindrical plugs affixed to the tube wall. Locking pins are provided for maintaining the folded position of the joints. There is no suggestion for providing three movable hinge parts with spring tensioning, and modifying the slotted ends of the tubular sections to non-slotted ends as in the present invention.

U.S. Pat. No. 3,801,208 issued on Apr. 2, 1974, to Elroy E. Bourgraf et al. describes a pivot lock for detachably and pivotally interconnecting a pair of opposing members, such as the frame parts of a breakaway stretcher. The hinge consists of two parts, wherein a tongued portion fits in a grooved portion or slot and pivots on a pin. The tongued portion contains a pin engaging latch member, which releasably maintains the pin in the slot. There is no suggestion for forming a three-part rod-shaped hinge.

U.S. Pat. No. 5,474,404 issued on Dec. 12, 1995, to Jui-Lung Chien describes a foldable playpen rail assembly consisting of a first outer shell, a second inner shell, two rail ends and a lock with two shoulders. The five parts are held together by two sets of two pins with springs. A third spring supports the button one the lock. There is no suggestion for forming a three-part, rod-shaped hinge.

U.S. Pat. No. 5,364,201 issued on November 15, to Berger A. LaBarre describes a hinged strut construction which comprises a pair of elongate rigid strut members having pivotal connector fittings, and a hinge structure adjoining the distal ends of the members to each other. The hinge structure consists of two end fittings threaded into the proximate ends of the strut members with their opposite ends hinged by ears with a pivot pin. A longitudinal pin is anchored to a release collar on one side of the hinge. By moving the collar away from the eared hinge, the locking pin is moved away from the joint against a compressed spring. The configuration of the hinge structure is dissimilar from, and not suggestive of, the present invention.

U.S. Pat. No. 3,655,297 issued on Apr. 11, 1972, to Hugh R. Bolen, Jr. et al. describes a coupling for a folding tubular paddle consisting of a hinge connecting two cylindrical plugs, wherein one plug is fixed and the other plug slides on a longitudinal bolt, when the paddle end is unscrewed from an internal nut. The hinge is formed from three right-angled links pinned to the plugs to permit the two paddle parts to fold together. There is no suggestion for utilizing a spring or the use of fewer than three links.

The following art of interest shows hinges for connecting rod members. U.S. Pat. Nos. 2,991,101, 2,991,102, and 2,991,103 issued on Jul. 4, 1961, to Aloys Wanwersch et al. describe connecting structures for beams of a roof support or the like. U.S. Pat. No. 3,044,478 issued on Jul. 17, 1962, to Ray A. Russell describes a hinge with a handle for a tiltable umbrella. U.S. Pat. No. 4,653,951 issued on Mar. 31, 1987, to John G. Bodle et al. describes a zero free-play joint for deployable space structures consisting of a hinged butt joint. U.S. Pat. No. 5,251,359 issued on Oct. 12, 1993, to Anthony W. Hinkl describes a heavy duty offset tube hinge with a ring for convertible tops for automobiles and boats. U.S. Pat. No. 5,588,771 issued on Dec. 31, 1996, to Gregory H. Scott et al. describes a connector for coupling a pair of rods. These patents rely on one hinge connections and lack spring members.

None of the above inventions and patents, taken either singularly or in combination, is seen to describe the instant invention as claimed. Thus, rod-shaped hinges and articles incorporating the same and solving the aforementioned problems is desired.

SUMMARY OF THE INVENTION

The present invention provides rod shaped hinges and articles incorporating the same, such as a tubular landing net and a solid snow stick, which are conveniently collapsible for transporting or storing.

A hinge for a tubular frame comprises a cylindrical base element with locking shoulders on each end which pin rotatable cylindrical and hooked extension elements. The extension elements have slots to accommodate the pins on the base element. Each extension element has a spring-loaded locking button for interacting with first locking apertures in the tubular frame. Each hook on the extension element is connected to a spring anchored within the tubular frame. The folding procedure only requires a pull on the landing net frame at the joints to dislodge the locking buttons to expand the anchor springs and relock the locking buttons in second locking apertures of the tubular frame to hold parts, e.g., a net and handle, in the folded position. The unfolding procedure requires little effort in dislodging the locking buttons to permit the expanded anchored springs to urge the opening of the parts, e.g., a landing net and handle.

The snow stick has several folding solid joints with springs, which enables the carrying of the folded snow stick in snow country, the stick being in a handled case strapped to the waist and thigh when not in use.

Accordingly, it is a principal object of the invention to provide rod-shaped hinges.

It is another object of the invention to provide a rod-shaped hinge having dual joints.

It is a further object of the invention to provide rod-shaped hinges in a folding tubular frame or a solid elongated article.

Still another object of the invention is to provide rod-shaped hinges in a collapsible landing net.

Yet another object of the invention is to provide rod-shaped hinges in a folding snow stick and a carrying case strappable on one's thigh.

It is an object of the invention to provide improved elements and arrangements thereof in rod-shaped hinges incorporated in either a collapsible landing net or a snow stick for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

The present invention provides as a first embodiment of a sports article a collapsible fish landing net frame and handle, incorporating a unique and economical rod-shaped hinge having three basic parts and inserted at only three joints of the tubular frame and handle. A second embodiment is directed to a folding snow stick and a carrying case strappable to one's thigh and waist.

Figure 1:
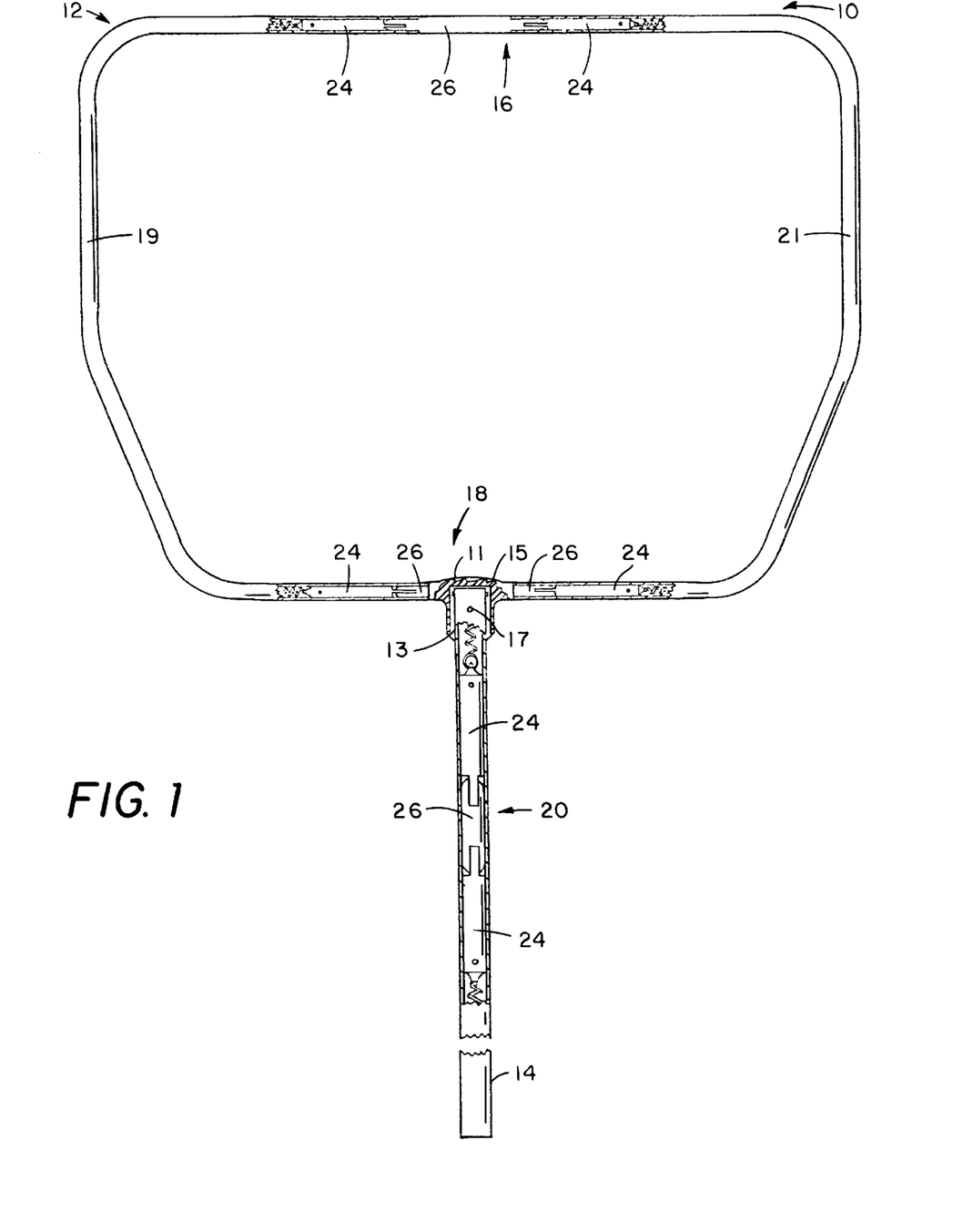
FIG. 1 is a plan view, as a first embodiment of a substantially rectangular framed collapsible landing net with rod-shaped hinges according to the present invention.

FIG. 1 depicts a collapsible or folding fish landing net 10 with a tubular rectangular net frame 12 (net not shown) and a detachable handle 14. The net frame 12 has a smaller diameter than the handle 14, therefore requiring hinges of different sizes. Hinge 16 is located at the center of the forward end of the net frame 12. Its mid-portion is expanded to match the diameter of the frame tubing and acts as a stop. Hinge 18 is separated in half and pinned in the T-frame 11 which is at the intersection of the frame 12 and the handle 14. Hinge 20 (longer than hinge 16) in the handle 14 is located proximate to the frame 12. Hinge 16 has a central portion elongated to align with the bending of the hinge 18 at the T-intersection. The T-frame 11 has an axial notch 13 (FIG. 8) to accommodate the spring-loaded pin 15 in the end of the handle 14. This feature facilitates the attachment of the handle 14 in proper alignment with the net frame 12. A set screw 17 in the T-frame 11 secures the handle 14 to the net frame 12.

Figures 2, 3:
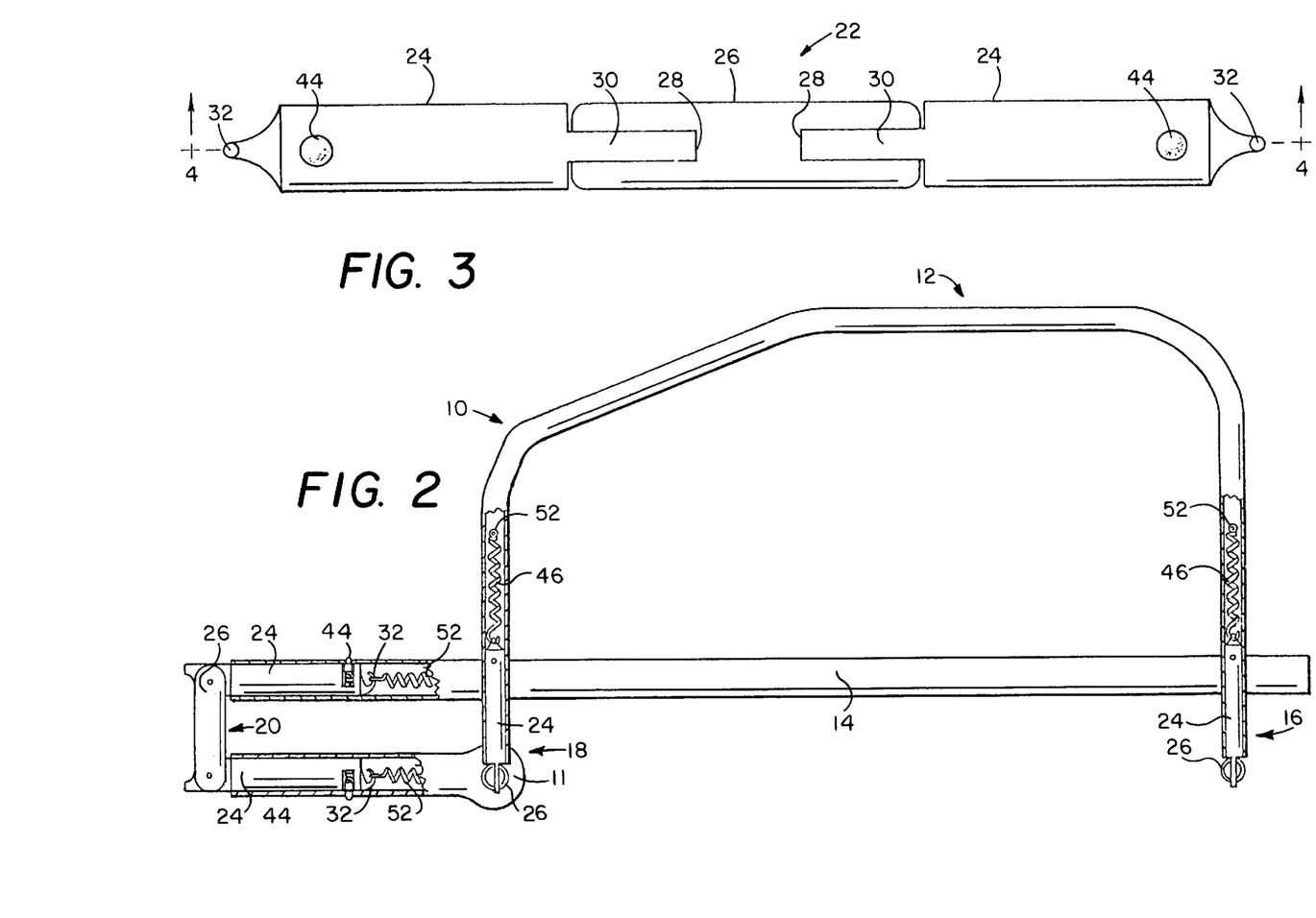
FIG. 2 is an elevational side view of the FIG. 1 net in a folded condition.
FIG. 3 is a plan view of a rod-shaped hinge without the hinge cover.

The left frame segment 22 and the right frame segment 24 will be folded against each other due to exposed hinges 16 and 18 as shown in FIG. 2, with the left frame segment 19 hidden. The third hinge 20 in the handle 14 will cause the longer segment to fit between the left and right frame segments 19 and 21, respectively. The fish landing net or webbing has been omitted from the frame 12. It should be noted that the substantially rectangular frame 12 is exemplary and circular frames are also contemplated within the present invention.

FIG. 3 is a plan view of a rod-shaped hinge 22 with two solid cylindrical extension elements 24 connected to the solid cylindrical base element 26 having slots 28 on each end which accept the centered flanges 30 of the extension elements 24. The opposite end of each extension element has a hook 32 as best seen in the sectional view of FIG. 4 taken along the midline 4—4 of FIG. 3.

Figure 4:
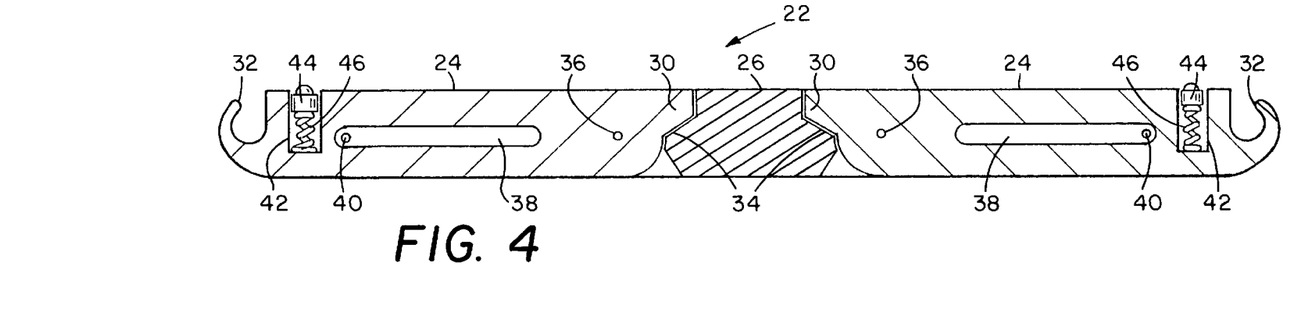
FIG. 4. is a sectional side view of the FIG. 3 hinge.

FIG. 4 shows further the shape of the slot 28 (FIG. 3) at the midsection of the base element 26 having shoulders 34 which lock with the centered flanges 30 of the extension elements 24 on either side. Pin 36 in the slotted region secures the centered flange 30 in the slot 28 and permits only rotation of the extension elements 24 relative to the base element 26 in a downward direction. A longitudinal slot 38 is present in each extension element 24 which is confined by a pin 40 attached diametrically in the same position as pin 36, but to the wall of the confining tube. A blind bore 42 is present next to the hook 32 for housing the locking button 44 attached to a compression spring 46.

Figure 5:
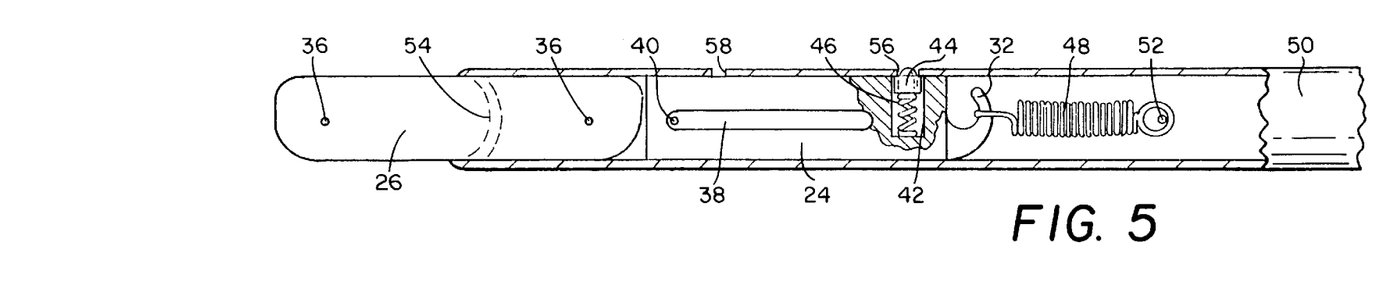
FIG. 5. is an elevational side view shown partially in section of the rod-shaped hinge in the unfolded but locked state.
Figure 6:
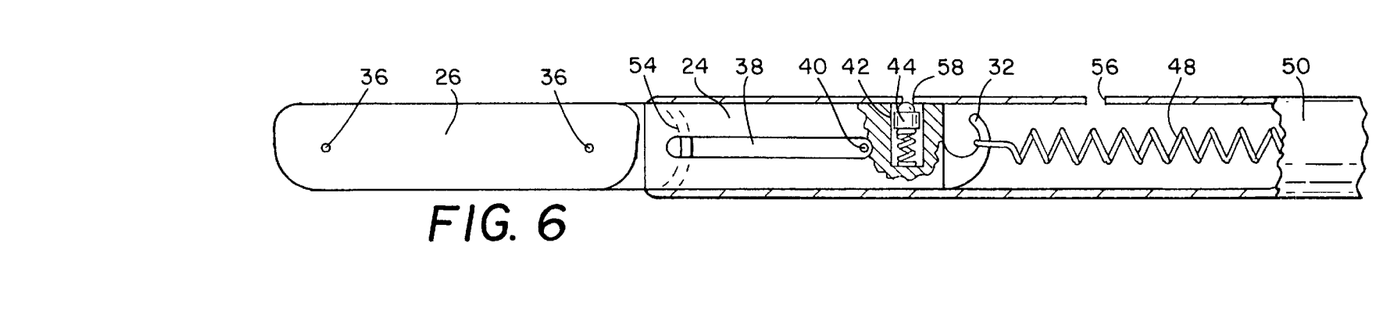
FIG. 6 is an elevational side view shown partially in section of the rod-shaped hinge with an extended spring prior to folding of the net joint.

FIGS. 5 and 6 depict the spring 48 (on each end) of a hinge 22 in the unstretched and stretched states, respectively, inside the tube 50 anchored by a pin 52 which traverses the diameter of the tube 50 and is aligned with the other pins 36 and 40. The double dashed lines designate the edge 54 of the tube 50 in a partial perspective view. In the unstretched state of FIG. 5, locking aperture 56 confines the spring-loaded button 44 to maintain the landing net frame 12 and handle 14 in the open and usable state. When the tubular frame proximate to a hinge 22 is to be folded, the button 44 is depressed and the frame portion is extended to enable the button 44 to engage the second aperture 58 which is smaller in diameter than the first locking aperture 56. It should be noted that the button 44 need not fully emerge to hold the bent portions in the folded position due to the positions of the extension elements 24 relative to the base element 26.

Figures 7, 8:
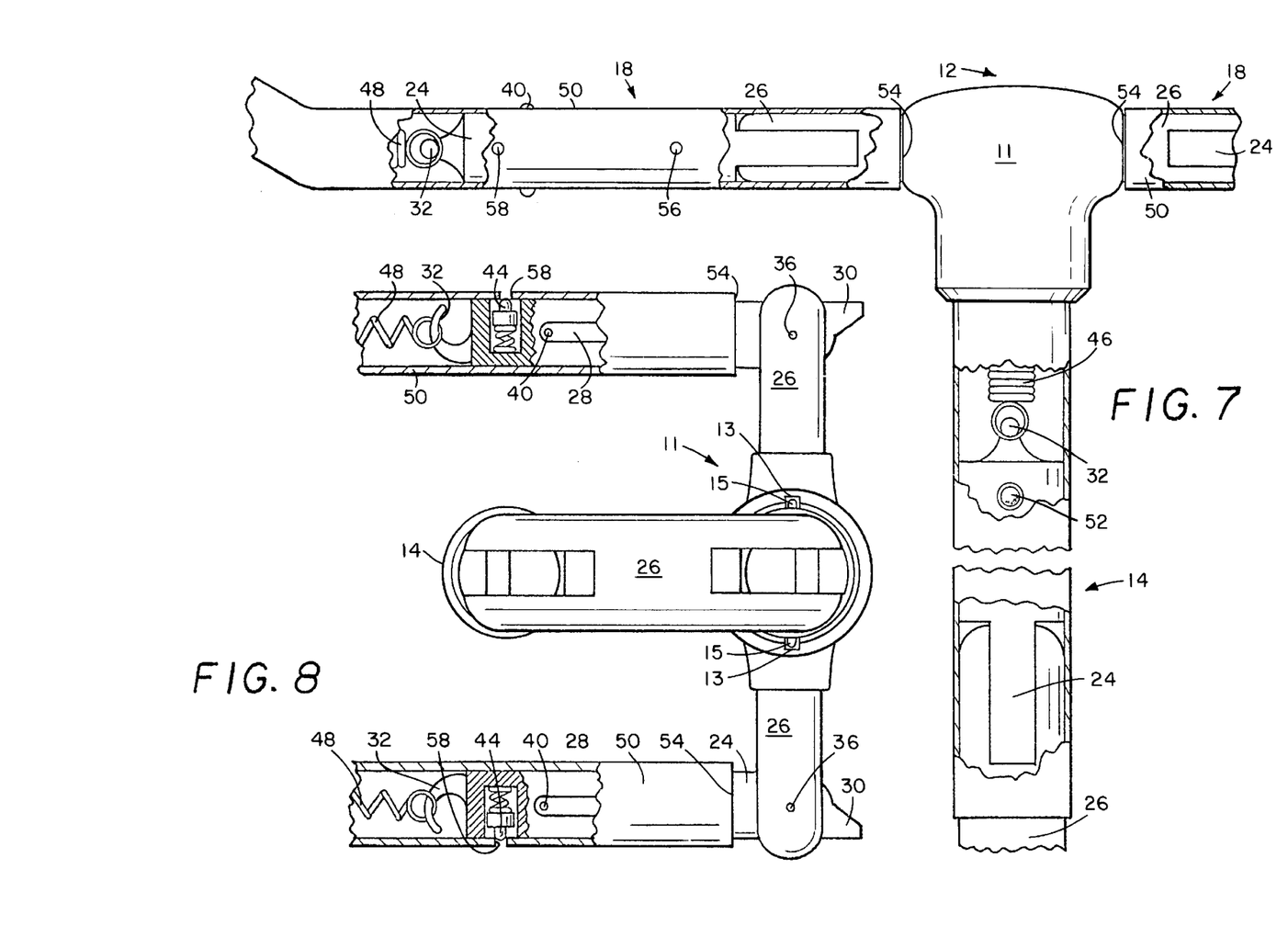
FIG. 7 is a plan view of the T-portion of the net frame and hinge shown in partial breakaway before folding.
FIG. 8 is an elevated partial side view of the T-portion of the net frame and hinge as viewed from the left side of the FIG. 2 net and shown in partial section after folding.
Figures 9, 10:
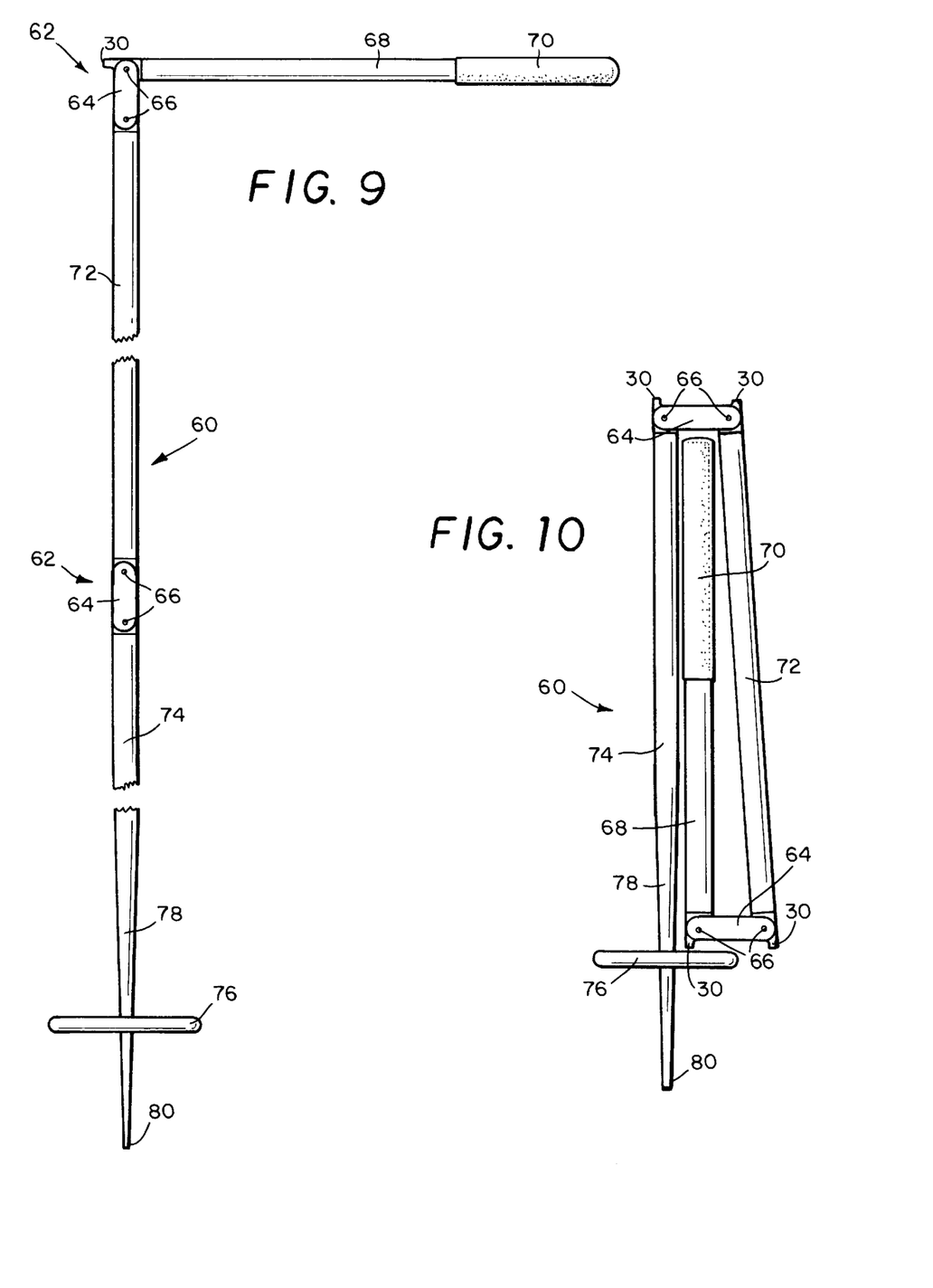
FIG. 9 is a side elevational view as a second embodiment of a partially folded snow stick.
FIG. 10 is a side elevational view of the FIG. 9 snow stick in a fully folded condition.

Turning to FIGS. 7 and 8, the T-frame 11 joining the net frame 12 with the handle 14 including the separated hinge 18 is illustrated, respectively, in the open state and the folded state. The base element 26 is actually cut in half and the parts are part of the T-frame 11. The locking button 44 is utilized to hold the extension element 24 with the second locking aperture 58 in the tube 50. As the tube 50 is pulled away from the T-frame 11 on either side of the T-frame 11, the spring 48 is stretched and exposes the base element 26 to permit rotation around pin 36 and folding of the net frame 12 at that point as shown in FIG. 8. Again, the locking button 44 need not fully catch in the second smaller engaging aperture 58 in the folded position because of the folded condition with the base element 26 wedged against the edge 54 of the tube 50.

Thus, a unique collapsible landing net 10 containing rod-shaped hinges 16, 18 and 20 permits the folding of the landing net for storage or portage.

Figure 11:
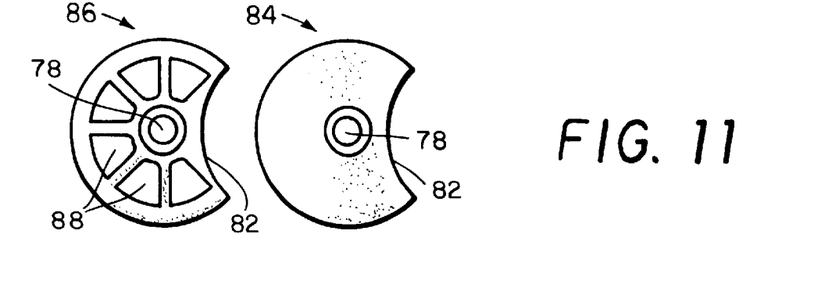
FIG. 11 is a plan view of two variations of snow stick pads.

Turning to the second embodiment incorporating the novel hinge of this invention, a folding snow stick 60 is illustrated in FIGS. 9–12. In this embodiment, the hidden parts of the rod shaped hinge 16 shown in FIG. 1 are not shown for the snow stick as being duplicative. The visible parts of each of the two rod-shaped hinges 62 consists of a base element 64 hinged at its ends by pins 66 to the sections. The handle section 68 has a grip 70 at an opposite end. The midsection 72 is hinged at both ends and has a length slightly longer than the handle section 68. The longest section is the pad section 74 and contains a substantially circular pad 76 at its narrow portion 78 proximate to the tip 80. The pad 76 has a cutout 82 as seen in FIG. 11. The solid pad 84 and the apertured pad 86 with apertures 88 are two preferred variations.

Figure 12:
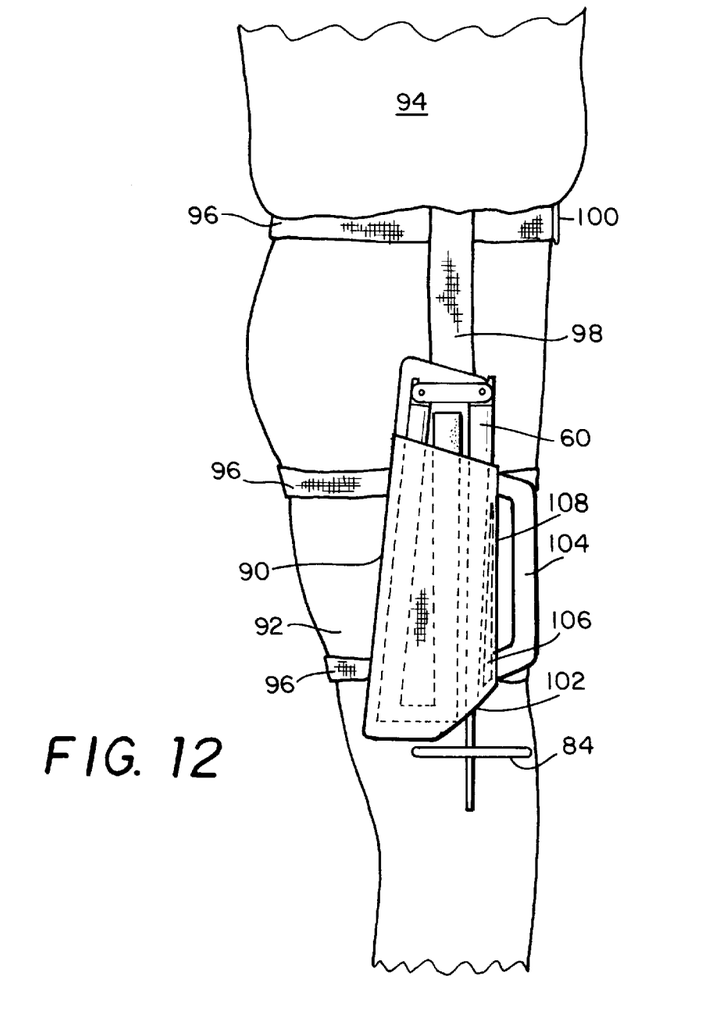
FIG. 12 is a front view of the folded snow stick carried in an openable case strapped on the right thigh of a person.

FIG. 12 illustrates a strappable carrying case 90 for the folded snow stick 60 strapped on the right thigh 92 of a person 94 by three horizontal straps 96 and a vertical strap 98. The waist strap 96 has a buckle 100. The case 90 has an aperture 102 at one corner for accommodating the pad 84 and a hook and loop closure 106 for the open side 108. The case has a handle 104 in the event that the case 90 is unstrapped and carried. Thus, the folded snow stick 60 can be conveniently carried on a person 94 ready to be utilized when the occasion for use arises.

It is to be understood that the present invention is not limited to the embodiments described above, but encompasses any and all embodiments within the scope of the following claims.

I claim:

1. A rod-shaped hinge for tubular joints comprising:
   a solid cylindrical base element having round shoulders on each end, there further being means defining slots in the shoulders dividing the shoulders into approximate halves;
   a pair of solid cylindrical extension elements with each having a centered hook on one end and a centered flange on an opposite end;
   each said centered flange of each said extension element being inserted in each respective said slot of said base element, there further being pivot pins for anchoring the flanges in their respective slots;
   a tube having a predetermined diameter;
   each said extension element further having an enclosed longitudinal slot being positioned on a pin fastened across the said diameter of said tube; and
   a spring coil anchored at one end within said tube proximate to said hook, and an opposite end being attached to said hook of each said extension element;
   whereby expansion of said tube at said joint against each said spring permits the folding of said joint.

2. The rod-shaped hinge according to claim 1, each said base element having a shoulder at a mid-point of its said slot.

3. The rod-shaped hinge according to claim 1, wherein each extension element has a locking tab at its end enclosed by said flanges of said base element, whereby said locking tab is positioned on the shoulder of said base element to maintain said joint in an extended and locked position.

4. The rod-shaped hinge according to claim 1, each said extension element having a spring-loaded button for locking said joint in extended and folded positions in cooperation with said tube.

5. The rod-shaped hinge according to claim 1, said tube having a pair of apertures for securing each said spring-loaded button, for locking said joint in extended and folded positions.

6. A collapsible folding sports article comprising:
   an elongated cylindrical sports article having a plurality of segments connected with solid hinge joints;
   said solid joints containing hinges;
   each said joint further including a solid cylindrical base element having round shoulders on each end, there further being means defining slots in and separating said shoulders;
   each segment having a centered flange on an end adjacent to said shoulders of said base element;
   a pivot pin in said slots of said base element, each said centered flange of each segment anchored by said pivot pin in said slots of said base element;
   each said base element having a shoulder at a midpoint of said slot;
   whereby the folding of said joints results in the collapsing of said sports article to form a compact package.

7. The sports article according to claim 6, each centered flange of each segment having a locking tab at the end enclosed by said flanges of said base element, whereby said locking tab is positioned on the shoulder of said base element to maintain said joint and said sports article in an extended position.

8. The sports article according to claim 6, said sports article being a landing net comprising a frame and a handle containing rod-shaped hinges comprising:
   a substantially rectangular jointed tubular frame;
   an elongated and jointed tubular handle;
   rod-shaped hinges inserted and slidable within said tubular frame and handle at the joints; and
   each hinge comprising:
      a solid cylindrical base element having round shoulders on each end, there further being means defining slots in and through said shoulders;
      a pair of solid cylindrical extension elements with each having a centered hook on one end and a centered flange on an opposite end;
      each centered flange of each said extension element being inserted in each said slot of said base element and anchored by pivot pins;
      each said extension element further having an enclosed longitudinal slot being positioned on a pin fastened across the diameter of said tubular frame and said handle; and
      a spring coil anchored at one end within said tubular frame and said tubular handle proximate to said hooks, and an opposite end being attached to said hook of each said extension element;
      whereby said landing net frame and said handle are folded at each joint by pulling the joints apart to expose said base element and pivoting the attached frame and handle portions to collapse said landing net frame and handle to form a compact package.

9. The sports article according to claim 8, including a fish landing net being attached to said collapsible landing net frame.

10. The sports article according to claim 8, said landing net frame having a joint centered on a forward end.

11. The sports article according to claim 8, said handle having a joint proximate to said landing net frame.

12. The sports article according to claim 8, said landing net frame having a joint at the intersection of said frame and said handle.

13. The sports article according to claim 8, each said base element having a shoulder at the mid-point of its said slot.

14. The sports article according to claim 8, each said extension element having a locking tab at the end enclosed by said flanges of said base element, whereby said locking tab is positioned on said shoulder of said base element to maintain said landing net frame and said handle in an extended and locked position.

15. The sports article according to claim 8, each said extension element having a spring-loaded button for locking said tubular net frame and said handle in the extended and folded positions.

16. The sports article according to claim 15, said tubular net frame and said handle having a pair of apertures for securing each said spring-loaded button in said extended and folded positions.

17. The sports article according to claim 6, said sports article being a snow stick having a handle grip at one end and a pointed end at an opposite end, and a substantially circular pad having a configuration with a cutout and a shape selected from a solid shape and an apertured shape, located adjacent said snow stick pointed end.

18. The sports article according to claim 17, further comprising a carrying case with a handle and a plurality of straps, strappable to a person's waist and thigh, said snow stick further being dimensioned and configured to be folded into a compact configuration and storable in said case having a hook and loop closure.

* * * * *